(12) United States Patent
Emberling

(10) Patent No.: US 9,311,205 B2
(45) Date of Patent: *Apr. 12, 2016

(54) METHOD AND SYSTEM FOR THREAD MONITORING

(71) Applicant: Advanced Micro Devices, Inc., Sunnyvale, CA (US)

(72) Inventor: Brian D. Emberling, San Mateo, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 370 days.

This patent is subject to a terminal disclaimer.

(21) Appl. No.: 13/840,154

(22) Filed: Mar. 15, 2013

(65) Prior Publication Data

US 2014/0108871 A1 Apr. 17, 2014

Related U.S. Application Data

(63) Continuation of application No. 12/258,935, filed on Oct. 27, 2008, now Pat. No. 8,413,120.

(51) Int. Cl.
*G06F 9/44* (2006.01)
*G06F 11/30* (2006.01)
*G06F 11/36* (2006.01)
*G06F 11/34* (2006.01)

(52) U.S. Cl.
CPC .......... *G06F 11/302* (2013.01); *G06F 11/3072* (2013.01); *G06F 11/348* (2013.01); *G06F 11/3636* (2013.01); *G06F 11/3648* (2013.01); *G06F 11/3476* (2013.01); *G06F 2201/86* (2013.01)

(58) Field of Classification Search
CPC .............. G06F 11/362; G06F 11/3644; G06F 11/3476; G06F 11/3466; G06F 11/348; G06F 11/3636; G06F 11/3648; G06F 2201/865; G06F 9/3009
See application file for complete search history.

(56) References Cited

U.S. PATENT DOCUMENTS 4,937,740 A * 6/1990 Agarwal et al. ............ 714/38.12
6,233,678 B1 5/2001 Bala
(Continued)

OTHER PUBLICATIONS

Luiz DeRose et al.; The Dynamic Probe Class Library—An Infrastructure for Developing Instrumentation for Performance Tools; 2001 IEEE; 7 pages; <http://ieeexplore.ieee.org/stamp/stamp.jsp?tp=&arnumber=925012>.*

(Continued)

*Primary Examiner* — Thuy Dao
*Assistant Examiner* — Cuong V Luu
(74) *Attorney, Agent, or Firm* — Volpe and Koenig, P.C.

(57) ABSTRACT

An apparatus and methods for hardware-based performance monitoring of a computer system are presented. The apparatus includes: processing units; a memory; a connector device connecting the processing units and the memory; probes inserted the processing units, and the probes generating probe signals when selected processing events are detected; and a thread trace device connected to the connector device. The thread trace device includes an event interface to receive probe signals, and an event memory controller to send probe event messages to the memory, where probe event messages are based on probe signals. The probe event messages transferred to memory can be subsequently analyzed using a software program to determine, for example, thread-to-thread interactions.

19 Claims, 6 Drawing Sheets

(56) References Cited

U.S. PATENT DOCUMENTS

| | | | |
|---|---|---|---|
| 6,493,868 B1 | 12/2002 | DaSilva et al. | |
| 6,708,326 B1 | 3/2004 | Bhattacarya | |
| 7,281,240 B1* | 10/2007 | Cantrill | 717/128 |
| 7,383,540 B2 | 6/2008 | Kalra | |
| 7,437,716 B1* | 10/2008 | Cantrill | 717/128 |
| 7,761,855 B2* | 7/2010 | Kalra | G06F 11/3644 714/34 |
| 7,958,486 B2 | 6/2011 | Tsyganskiy et al. | |
| 8,020,148 B2 | 9/2011 | Robertsson | |
| 8,239,836 B1* | 8/2012 | Franz | G06F 11/1487 717/127 |
| 8,413,120 B2 | 4/2013 | Emberling | |
| 2002/0065948 A1 | 5/2002 | Morris et al. | |
| 2004/0059962 A1* | 3/2004 | Robertsson | 714/38 |
| 2004/0111707 A1* | 6/2004 | Bliss | G06F 11/362 717/129 |
| 2004/0244011 A1 | 12/2004 | Morris et al. | |
| 2005/0010893 A1 | 1/2005 | Schmidt et al. | |
| 2005/0216895 A1* | 9/2005 | Tran | G06F 11/362 717/127 |
| 2006/0294158 A1 | 12/2006 | Tsyganskiy et al. | |
| 2008/0115113 A1* | 5/2008 | Codrescu | G06F 9/3005 717/127 |
| 2008/0115115 A1* | 5/2008 | Codrescu | G06F 11/3656 717/128 |
| 2008/0270988 A1* | 10/2008 | Li | G06F 11/362 717/125 |
| 2010/0107252 A1* | 4/2010 | Mertoguno | 726/23 |
| 2011/0107305 A1* | 5/2011 | Baron | G06F 11/3664 717/125 |

OTHER PUBLICATIONS

Luiz DeRose et al.; An Implementation of the POMP Performance Monitoring Interface for OpenMP Based on Dynamic Probes; 2001 IEEE; 10 pages; <http://www.compunity.org/events/ewomp03/omptalks/Tuesday/Session6/T16p.pdf>.*

Kari Leppala et al.; Real-Time Approach for Development of Scientific Space Instrument Software; 1996 IEEE; pp. 139-144; <http://ieeexplore.ieee.org/stamp/stamp.jsp?tp=&arnumber=557844>.*

Hu Zhong et al.; The Development of A Real-Time Hardware-in-the-Loop Test Bench for Hybrid Electric Vehicles Based on Multi-Thread Technology; 2006 IEEE; pp. 470-475; <http://ieeexplore.ieee.org/stamp/stamp.jsp?tp=&arnumber=4234073>.*

M. Dolores Valdes et al.; A Data Acquisition Reconfigurable Coprocessor for Virtual Instrumentation Applications; 2003 Springer; pp. 1107-1110; <http://link.springer.com/chapter/10.1007/978-3-540-45234-8_131>.*

Marc Boule et al.; Adding Debug Enhancements to Assertion Checkers for Hardware Emulation and Silicon Debug; 2006 IEEE; 6 pages; <http://ieeexplore.ieee.org/stamp/stamp.jsp?tp=&arnumber=4380831>.*

Cantrill, B.M. et al., "Dynamic Instrumentation of Production Systems", 2004 USENIX, 27 pages, <http://static.usenix.org/publications/library/proceedings/usenix04/tech/general/fall_papers/cantrill/cantrill_html/>.

Desnoyers, M. et al., "Tracing for Hardware Driver and Binary Reverse Engineering in Linux", 2006 CodeBreaker Journal, 6 pages, <http://powerhacker.Net/documents/Reverse_Engineering/codebreakers_journal/53-283-1-PB.pdf>.

Kamble, N.A., "Evolution in Kernel Debugging using Hardware Virtualization With Xen", 2006 Linux Symposium, 436 pages, <http://scourge.fr/mathdesc/documents/kernel/linuxsymposium_procv2.pdf>.

Kumar, N. et al., "Instrumentation in Software Dynamic Translators for Self-Managed Systems", 2004 ACM, pp. 90-94, <http://dl.acm.org/citation.cfm?id=1075405>.

Kumar, N. et al., "Tdb: A Source-level Debugger for Dynamically Translated Programs", 2005 ACM, pp. 123-132, <http://dl.acm.org/citation.cfm?id-1 085130>.

Moore, R.J., "Dynamic Probes and Generalised Kernel Hooks Interface for Linux", 2000 usenix.org, pp. 135-146, "http://static.usenix.org/publications/library/proceedings/als00/2000papers/papers/full_papers/moore/moore_html/".

* cited by examiner

METHOD AND SYSTEM FOR THREAD MONITORING

BACKGROUND OF THE INVENTION

1. Field of the Invention

The present invention relates generally to performance monitoring in computer systems.

2. Background Art

Computer systems, for example, computer processors including central processor units (CPU) and graphics processors (GPU), are capable of executing increasing numbers of processing threads in parallel. The parallel execution of numerous threads can yield substantial increases in performance and overall efficiency in the computer system.

Debugging computer applications is complex. The complexity of debugging increases when the application concerned executes in an environment having multiple threads or processes. Multiple simultaneously executing threads can cause processing delays due to numerous issues such as thread synchronization, resource sharing, resource contention etc. For example, designers of a GPU having multiple execution units may expect a particular level of performance based on the number of execution units, but some applications having a large number of parallel threads may yield a much lower level of performance due to thread interaction issues.

Conventionally, most processor and application designers have debugged issues such as thread interaction using instrumented code and/or performance counters. Instrumenting the code, in general, involves inserting additional statements in the code before and/or after selected processing steps. The additional statements usually are directed to steps such as incrementing or decrementing performance counters, or writing debug messages. In general, such additional statements increase the size of the executable code and slows the processing speed due to additional steps and output requirements. Therefore, although instrumenting the code allows for many debugging issues to be resolved, by allowing the behavior of the application to be changed due to additional processing steps, many complex issues involving multiple threads may go undetected.

Performance counters are implemented by instrumenting the code and/or using hardware-based probes to increment and decrement a set of software counters or registers. Performance counters count the occurrences of each of a predetermined set of events. Unlike instrumented code, hardware-based probes can be inserted so as not to impact the general processing flow of the system.

In many computer systems, numerous performance counters are available. For example, performance counters may provide a count of the number of threads executing at a given time, the highest number of threads that were executing in parallel at any point during the execution of an application, and/or the highest level of memory usage during the execution of an application, etc. However, performance counters, even when implemented using hardware-based probes, can provide only a view of system performance that is aggregated over defined time intervals. Performance counters cannot illustrate the interactions between any two threads that happen to be executing simultaneously.

In the case of both instrumented code and performance counters, the user is often left to trial and error to detect application issues while controlling the impact of additional debugging steps on application performance and interactions. For example, at some debugging levels, so many performance counters may be accessed or so many debug statements may be written, that the memory input/output may be increased to a level that impacts the servicing of processing threads.

What is needed therefore is a hardware-based dynamic thread performance monitoring system that that monitors the performance of the system without impacting the actual performance of applications.

BRIEF SUMMARY OF THE INVENTION

Apparatus and methods for hardware-based performance monitoring of a computer system are presented, in one embodiment, an apparatus for monitoring the performance of a computer system, includes: one or more processing units; a memory; a connector device connecting the one or more processing units and the memory; one or more probes inserted in at least one of said processing units, and said one or more probes generating probe signals when predetermined processing events are detected; and a thread trace device connected to the connector device. The thread trace device includes an event interface configured to receive probe signals, and an event memory controller configured to send probe event messages to the memory, wherein probe event messages are based on probe signals.

In another embodiment a method for monitoring performance of a computer system is presented. The method includes: inserting one or more event probes in one or more hardware-based processing units, where the event probes are configured to generate probe events when predetermined processing events are detected; configuring a hardware-based device to generate probe event messages based on said probe events; and transferring the probe event messages to a memory. The probe event messages transferred to memory can be analyzed using a software program.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It would be apparent to one of skill in the art that the present invention, as described below, may be implemented in many different embodiments of hardware, firmware, software (which may include hardware description language code), and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

This disclosure presents systems and methods for hardware-based performance monitoring in a computer system. A person skilled in the art will recognize that the teachings provided herein may be applied to monitoring various aspects affecting the performance of a computer system, such as, including but not limited to, processes and threads. Without loss of generality, the computer system environment described in this disclosure comprises primarily of a graphic processing unit (GPU) having multiple execution units, and implementing applications involving numerous simultaneous threads created by multiple processes including vertex shaders, geometry shaders, and pixel shaders.

Figure 1:
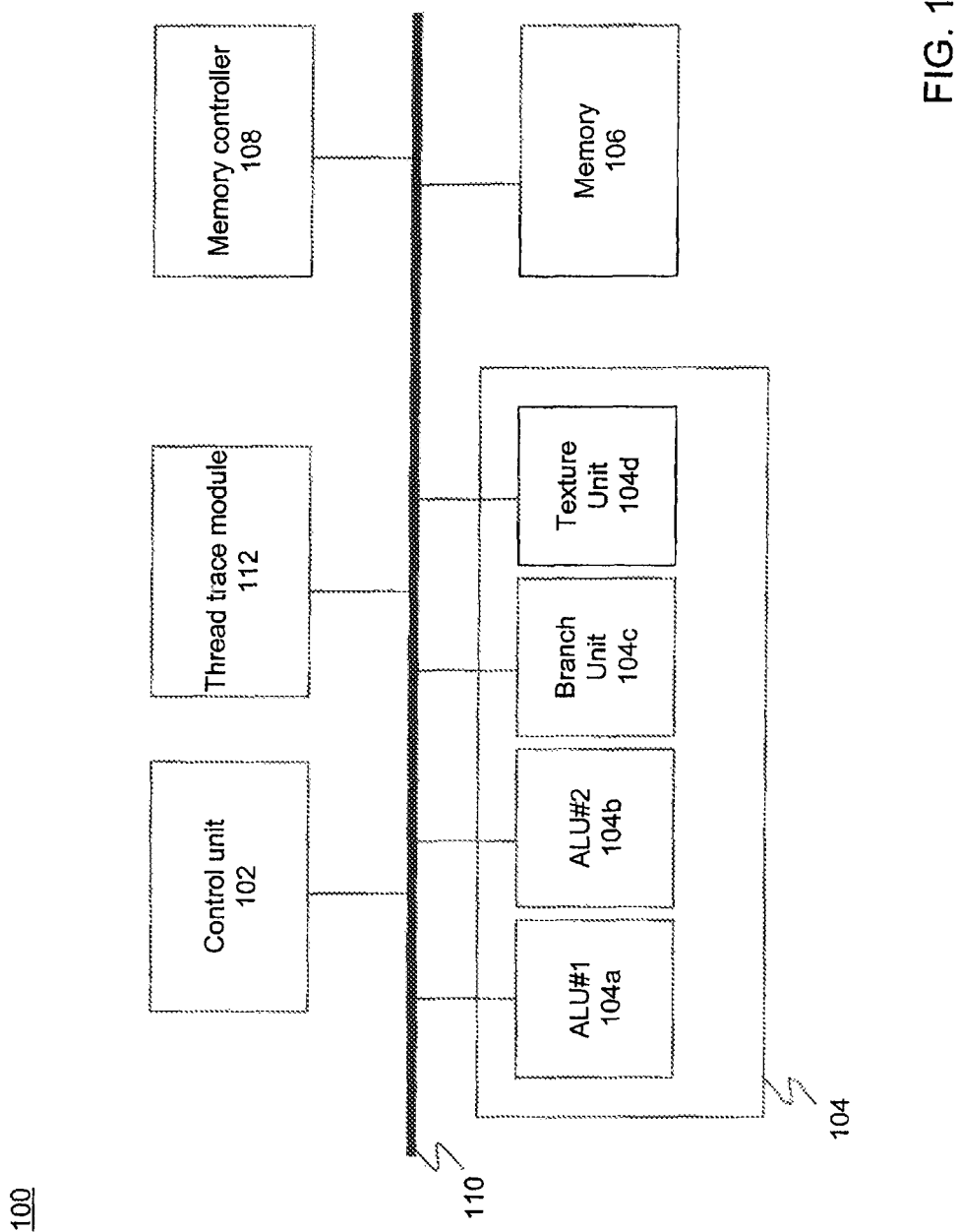
FIG. 1 is an apparatus to monitor the performance of a computer system, according to an embodiment of the present invention.

FIG. 1 is a computer system 100 according to an embodiment of the present invention. Computer system 100 includes a control unit 102, one or more execution units 104, a local memory 106, a memory controller 108, a communications bus 110, and a thread trace device 112. Computer system 100, in this embodiment, may represent a graphics processing unit (GPU). In other embodiments, computer system 100 may represent, for example and without limitation, a central processing unit (CPU), a multiple processor device, a field programmable gate array (FPGA)-based processing device, a digital signal processor (DSP)-based processing device, or an application-specific integrated circuit (ASIC)-based processing device.

Control unit 102 may represent any processor capable of executing an application program. Based on the application, control unit 102 can create and distribute threads and processes and/or issue instructions to be processed by a plurality of processing units or execution units 104. In FIG. 1, four separate execution units are shown: an arithmetic and logic unit (ALU) 104a an ALU 104b, a branch unit 104c, and a texture fetch unit 104d. For example, during the execution of an application process, control unit 102 may spawn multiple simultaneous threads.

During the execution of one or more of these threads, control unit 102 may issue ALU-specific instructions (such as, for example, arithmetic or movement instructions) to ALU 104a and/or ALU 104b, branching determinations to branch unit 104c, and texture instructions to the texture unit 104d. Instructions issued to execution units 104a-104d can execute simultaneously, and may each notify control unit 102 when one or more assigned instructions are completed. Control unit 102 and/or execution units 104 may include internal registers, for example, to maintain performance counters for monitoring of events such as number of threads created, number of threads successfully completed, number of instructions of defined types, highest number of simultaneously active threads, etc.

Local memory device 106 may comprise one or more dynamic memory devices such as a random access memory (RAM). Local memory 106 may be utilized by control unit 102 and execution units 104 to store and retrieve instructions and/or data. For example, instructions may be allocated among execution units by control unit 102 writing those instructions to a predetermined location in local memory 106 and execution units being notified in some manner such as an interrupt. Local memory 106 may also, for example, be used to exchange data between threads and between execution units 104 and control unit 102. Local memory 106 may also include memory used as registers to maintain various performance counters.

Memory controller device 108 coordinates access to local memory 106. In some embodiments, memory controller device 108 may also coordinate access to an external memory (not shown). For example, when control unit 102 and execution unit 104 simultaneously request to write some data to local memory 106, memory controller 108 coordinates the writing of that data to memory 106. The communication between devices requiring access to memory 106 and memory controller 108 may use messages exchanged via communications bus 110 or some other mechanism such as interrupts.

Communications bus (or system bus) 110 may be any device interconnecting mechanism such as, but not limited to, peripheral component interconnect (PCI). A person skilled in the art will understand that a multitude of technologies can be used for communications bus 110. Communications bus 110, directly or indirectly, interconnects devices 102, 104, 106, 108, and 112. Depending on the communications protocol used to interconnect various devices over communications bus 110, the processing capacity of the computer system 100 may be affected by the capacity of communications bus 110 to transfer instructions and data between devices interconnected to it.

Thread trace device 112 is configured to detect and collect predetermined event types that occur in some or all of the devices of computer system 100, including devices 102, 104, 106, 108, and 110. For example, thread trace device 112 can monitor a predefined set of probes and collect data whenever those probes are triggered. In the embodiment illustrated in FIG. 1, probes can be implemented in one or more devices including control unit 102 and execution units 104. Probes can also be inserted to monitor traffic on communications bus 110, and to monitor activity in memory controller 108. Thread trace device 112 can monitor one or more probes, collect data, perform filtering of the probe data according to user and system requirements, and transfer the data to memory so that the data can be analyzed using a separate software module (not shown).

Thread trace device 112 can also actively monitor the system performance and dynamically reconfigure the collection and transfer of probe data so that the collection and transfer of probe data does not significantly affect system performance. Thread trace device 112 can generally be implemented as one or more separate circuits interconnected to the rest of the computer system 100. Probes can be implemented in many ways, including using circuitry that generates appropriate signals to thread trace device 112 by monitoring registers at regular clock intervals.

Figure 2:
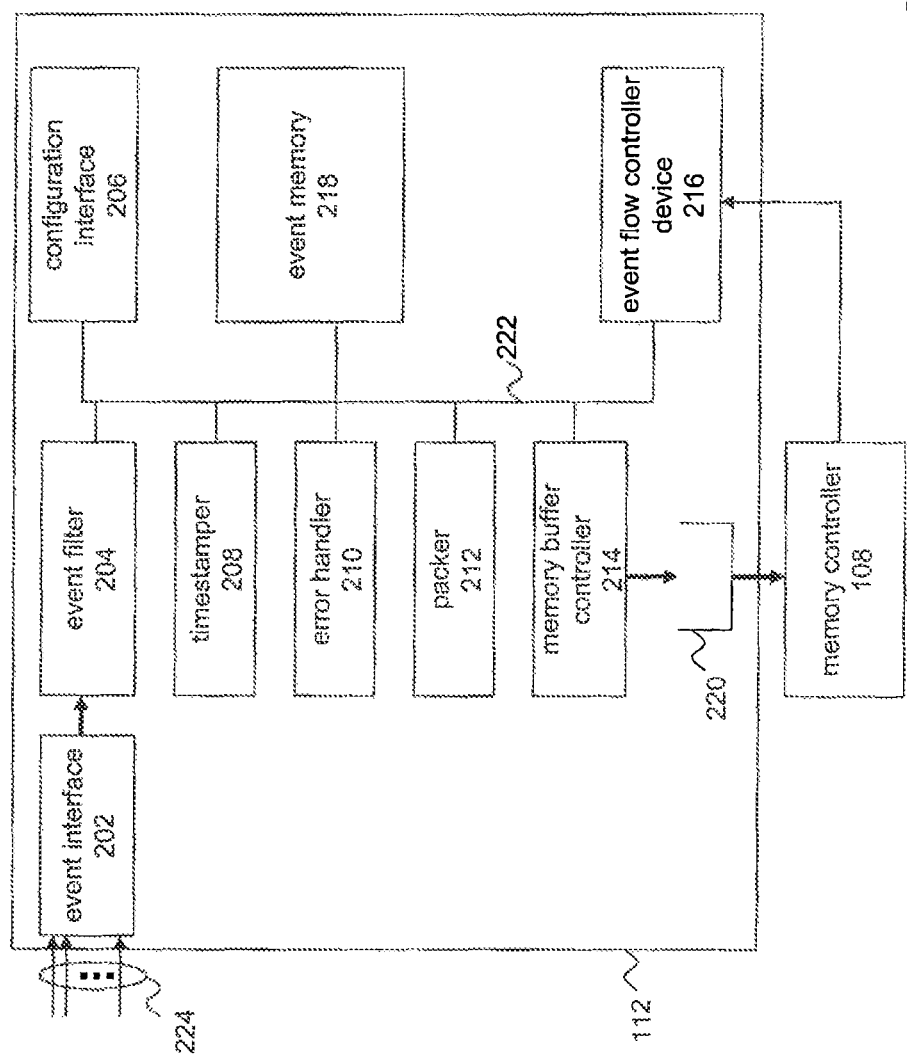
FIG. 2 shows the thread monitoring module of FIG. 1, according to one embodiment of the present invention.

FIG. 2 is an illustration of thread trace device 112 according to one embodiment. Thread trace device 112 can include an event interface device 202, an event filter device 204, a configuration interface device 206, a timestamper device 208, and an error handler device 210. Thread trace device 112 can also include an event packer device 212, a memory buffer controller device 214, an event flow controller device 216, an event memory 218, and interconnections connecting the devices such as, but not limited to, a communication bus 222. Event interface device 202 provides the interface for thread trace device 112 to receive probe events from other devices of computer system 100.

In one embodiment of the present invention, event interface 202 can be implemented as a set of registers that are updated by signals 224 generated by devices of system 100 and monitored every clock cycle by thread trace device 112 to generate a set of incoming probe events. Event filter 204 filters the incoming probe events based on configuration and/or system performance. For example, user configuration received through configuration device 206 may define that all probe events other than thread-create and thread-terminate events should be filtered out. Event filtering device 204 can then drop (i.e., filter-out) all incoming probe events except thread-create and thread-terminate events as specified by the user from being further processed in thread trace device 112.

Configuration device 206 can include an interface, such as a JTAG (IEEE 1149.1 Standard Test Access Port and Boundary-Scan Architecture) interface, that allows a user to activate or deactivate a set of probe event monitors. A user, in this case, can be a human operator or a computer program.

In one embodiment, thread trace device 112 can generate a probe event message from incoming probe events, for example, as part of the processing in event interface device 202. The probe event messages can be, for example, generated in an event memory 218. In another embodiment, the incoming probe events can be received as probe event messages. Probe event messages can have a fixed format or a variable format that is understood by devices in thread trace device 112, and perhaps also by software programs that access the probe event messages stored in memory 106. Timestamper device 208 timestamps probe event messages to be processed. The timestamp can be based on clock cycles since the last reset of thread trace device 112. The timestamp should be of sufficient granularity to detect thread interactions in each particular application, and can be configurable.

In one embodiment, for example, it may be sufficient to maintain only a delta timestamp from the previous event, and thereby reduce the number of bits required to maintain the timestamp in each probe event message. Timestamper device 208 can also insert timestamp messages into the probe event message stream as necessary to maintain a trail of the time.

Error handler device 210 can include functionality to handle probe events that are missing. For example, error handler device 210 can, by monitoring the probe event message sequence, insert a predetermined marker to indicate the type and content of a missing probe event, such that the application processing the probe events can still make use of the probe event messages. Error handler device 210 may also make available the functionality to attach user data based on each event type to each corresponding probe event message. In some embodiments, error handler device 210 can also compress the event data as appropriate. For example, event data can be compressed according to a scheme that is customized to an application that would subsequently process the event data.

Event packer device 212 can arrange the probe event messages in event memory 218 to generate a block of event messages that can be efficiently transferred to memory 106 or other memory (not shown) through memory controller 108. Event packer device 212 can also include some of the functionality to compress the event messages as mentioned above. Event packer device 212 packs one or more probe event messages into packed units of probe event data that can be transferred through memory controller 108. A packed unit of probe event data can include one or more timestamped probe event messages embedded with error handling markers as necessary and compressed as appropriate.

Event buffer controller device 214 controls an internal memory buffer 220 through which thread trace device 112 transfers packed units of event data. Internal buffer 220 can be implemented as a first-in-first-out (FIFO) buffer sized to hold a multiple of packed units of probe events. In some embodiments, internal buffer 220 can be part of event data memory 218. Event data memory 218 can be accessible by many devices within thread trace device 112, including error handler device 210 and event packer device 212.

Event buffer controller device 214 may include functionality to store packed event data in an internal memory buffer 220, to address the packed event data to be stored in local memory 106, and to coordinate the transfer of that event data through memory controller 108.

Event flow controller device 216 includes the functionality to receive feedback from memory controller 108 and accordingly adjust the rate at which probe events are processed and output from thread trace device 112 as packed units of event data. For example, if feedback from memory controller 108 indicates that memory accesses in the system are above a predetermined threshold, then event flow control device 216 can initiate action in thread trace device 112 to have incoming probe events filtered at an increased level so that the rate at which packed event data is transferred to memory from thread trace device is reduced.

Similarly, when feedback from memory controller 108 indicates that memory accesses in the system are below a predetermined threshold, then event flow controller device 216 can initiate action to have incoming probe events filtered at a lowered level so that the rate at which packed event data is transferred to memory from thread trace device 112 may be increased. Event flow controller device 216 allows the trace level to be adjusted dynamically to suit system conditions.

Figure 3:
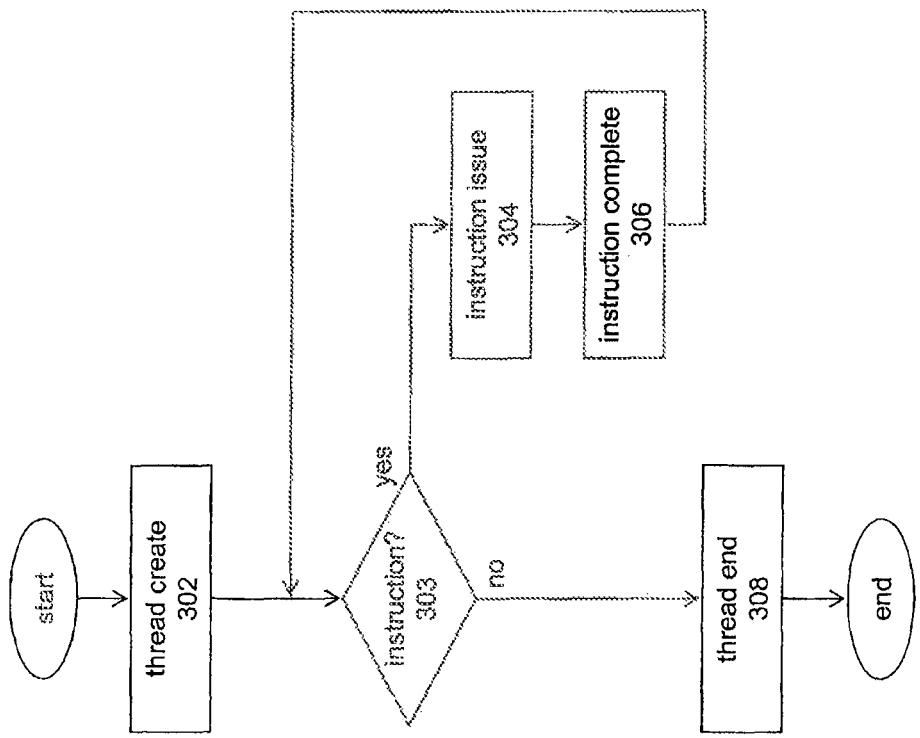
FIG. 3 shows a typical sequence of thread events that may be monitored per thread in an embodiment of the present invention.

FIG. 3 is an example set of thread events that may be collected during the lifetime of a thread, according to one embodiment of the present invention. A thread create event 302 is generated when a process or a thread is spawned by a process. Using computer system 100 as an example, in general, thread create events 302 are originated on control unit 102. A thread create event 302 contains event data elements such as a thread identifier, a thread type, parent process or thread, and identifier of the processor upon which the thread was created. At the end of the thread's lifetime, a thread terminate event 308 is issued, usually from the same processor in which the thread create 302 event was issued from. However, note that thread create event 302 and thread terminate event 308 may not always originate from the same processor.

Between thread create event 302 and thread terminate event 308 are many instruction issues to accomplish one or more processing tasks. After the thread create event 302, the thread proceeds to step through each of the instructions to be processed in step 303. Instruction issue event 304 is generated each time an instruction is issued, for example, by control unit 102. The issued instructions may be assigned to one or more execution units 104 or other processor. Therefore, for example, instruction issue probes may be present in control unit 102 as well as execution units 104. Instruction issue data events should identify such data elements as, instruction identifier, instruction type, issuing thread or process, assigned execution unit. When the respective execution unit has completed executing the instruction, an instruction complete event 306 is generated. Instruction complete event 306 may be generated by the respective execution unit or processor to which the instruction was assigned.

Probe events corresponding to events 302, 304, 306, and 308 identify the thread would yield an accurate timeline of the processing of a particular thread. Thread trace device 112 monitors probe events and collects them according to user specified criteria and system requirements. When combined with probe events generated corresponding to other threads that were simultaneously active in the computer system, a substantially complete view of threads and thread interactions of the computer system can be obtained. Such a view can then be used to identify issues, including thread interaction issues.

Figure 4:
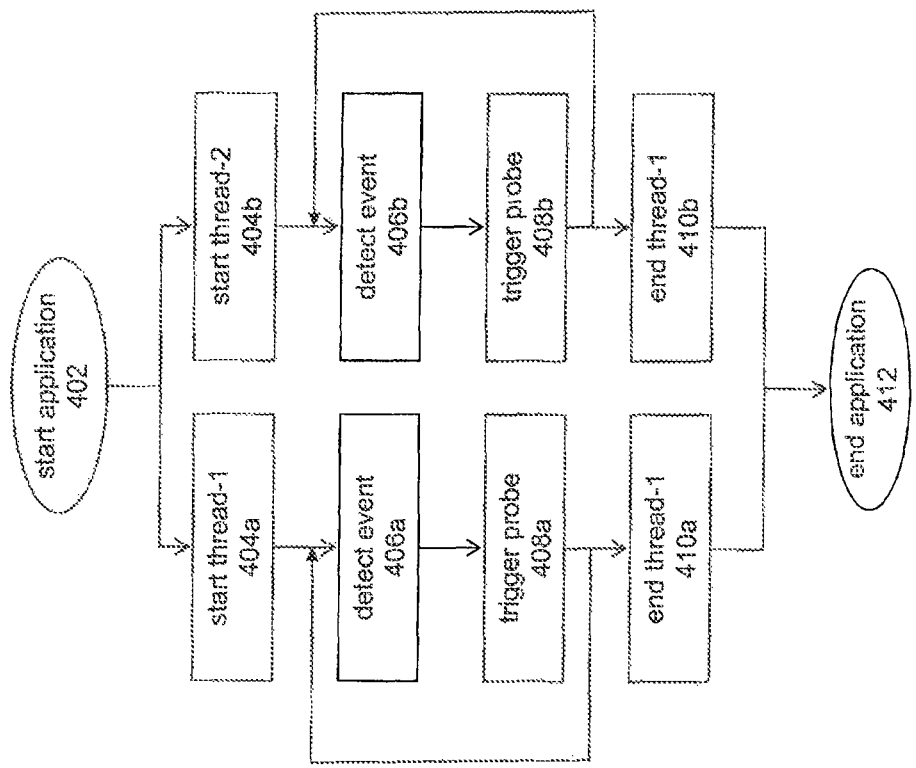
FIG. 4 shows a flowchart of steps generating probe events in hardware components according to an embodiment of the present invention.

FIG. 4 is a flowchart 400 illustrating an exemplary sequence of processing probe events in one embodiment of the present invention where an application is executed generating probe events. In step 402, an application process is instantiated or started on a processor, for example, control unit 102 in computer system 100. Each thread spawned by the application process, executes independently and may themselves spawn other threads.

More specifically, FIG. 4 is an illustration of a probe event sequence when two threads are active. In step 404, threads are spawned generating probe events. Specifically, step 404*a* issues a probe event when thread thread-1 is created, and step 404*b* separately issues a probe event when thread thread-2 is created. The temporal relationship of steps 404*a* and 404*b* is based on when each thread is spawned. But the temporal relationship between steps 406*a* and 406*b*, 408*a* and 408*b*, etc., depend on additional factors such as the type of instruction and the time taken to execute each instruction.

For each thread, as the execution proceeds generating probe events such as issuing instructions, steps 406 (or specifically, step 406*a* in thread-1 and step 406*b* in thread-2) and 408 (or specifically, step 408*a* in thread-1 and step 408*b* in thread-2) are repeated. A set of predetermined events types are configured to trigger probe events. As the processing progresses, such events are encountered by the processing thread in step 406 and in step 408, a probe event is generated for that event if configured to do so. When a thread completes execution in step 410 (or specifically, step 410*a* in thread-1 and step 410*b* in thread-2), a thread complete probe event may be generated. When all threads spawned by the application have terminated, and all other processing by the application have completed, the application process terminates in step 412.

Figure 5:
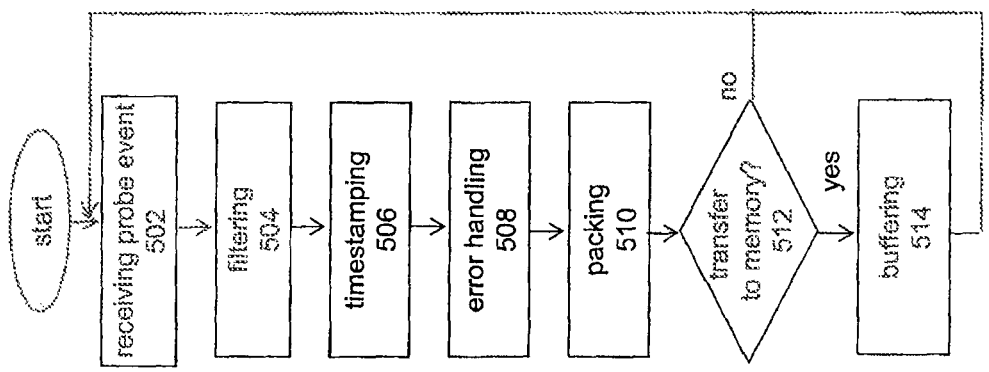
FIG. 5 shows a flowchart of steps occurring in a thread trace module when probe events are collected according to an embodiment of the present invention.

FIG. 5 is a flowchart 500 illustrating exemplary processing steps in thread trace device 112 when a probe event is received. In step 502, a probe event is received in thread trace device 112, for example, triggered by an event as described in flowchart 400. Probe events may be received by many means. For example, thread trace device 112 may actively poll registers to which probe events are written when they occur, such as, for example, performance counters for various types of thread events spread throughout the computer system 100.

As another example, thread trace device 112 may receive a signal for each probe event that is triggered, such as, for example, a data packet including the information necessary to distinctly identify each probe event. In either case, in step 502, a data packet that is representative of the probe event (i.e., a probe event message) can be generated. For each probe event received in thread trace device 112, a determination is made in filtering step 504 whether to further process the received probe event. For example, due to user configuration or other considerations, it may be determined to filter out all probe events except for thread create events and thread terminate events.

If it is determined that the received probe event is to be further processed, then in step 506 the received probe event message may be timestamped. The timestamp enables precise ordering of the probe events in subsequent analysis. In step 508, error control can be performed on the probe event data. For example, in step 508, missing probe events, particularly those that are necessary for a useful analysis of the system behavior, may be represented in an aggregated manner. Particular probe events that are not received in the thread trace device may be represented with an appropriate error handling marker so that the subsequent analysis can distinguish event data inserted from event data that was actually observed. For example, based on the inserted marker, an application that analyzes the data can recreate some or all of the missing probe events, prior to analysis.

Also in step 508, in some embodiments, some level of compression may be performed in accordance with the requirements of the application that would subsequently access the probe event data for analysis. For example, the timestamp may be truncated to only provide the required granularity for a particular scenario, frequently occurring events may be encoded to make the corresponding probe event messages smaller, or selected events may be aggregated or deleted.

In step 510, the probe event messages are packed. For example, one or more probe event messages may be packed together to make a event data unit of a predetermined size that can be transmitted to memory. The packing of the event data packets may take place in a memory that is local to the thread trace device (e.g., event memory 218 in thread trace device 112). In step 512, after packing each received probe event, a determination is made if enough data is in the event data unit to be transmitted out. In step 514, if the event data unit is deemed to be sufficient it is deposited in a buffer (e.g., transfer from event memory 218 to buffer 220 in device 112) to be transmitted out to memory. Otherwise, additional probe events are needed before that event data unit can be stored in the outgoing buffer. The event data unit may also be addressed appropriately to be stored in memory (e.g., for transferring to memory 106).

Once the event data unit is created and deposited in the outgoing memory buffer, a memory controller, for example, memory controller 108 in computer system 100, can retrieve the event data unit, and according to the address specified in the event data unit, transfer that to a memory, such as memory 106. An application that enables the analysis of collected trace data may access the probe event message data stored in memory, in real-time or after the completion of the event generating application.

Such an application or trace event processing module can be implemented in software and executed on control unit 102, another control unit (not shown) in computer system 100, or an external computer (not shown) connected to computer system 100. If internal to computer system 100, then the trace event processing module can access the relevant data in memory 106 through memory controller 108. If the trace event processing module is executed on an external computer, then suitable software should be available on computer system 100 to provide the relevant data from memory 106.

The transfer of probe events to memory consumes system resources. For example, as probe event messages (or event data units) are transferred to memory over communication bus 110, the corresponding memory traffic is increased proportionally to the probe event generation frequency. At some level of probe event generation, the probe event related memory activity may interfere with the system performance and/or thread behavior. For example, in computer system 100, when event data units are transferred to memory 106 by memory controller 108 through communications bus 110, the use of bus 110 by the execution units 104 for accessing data for regular processing purposes may be adversely affected. It is generally highly desirable to ensure that the system monitoring activity does not interfere with the system performance and/or thread behavior.

Figure 6:
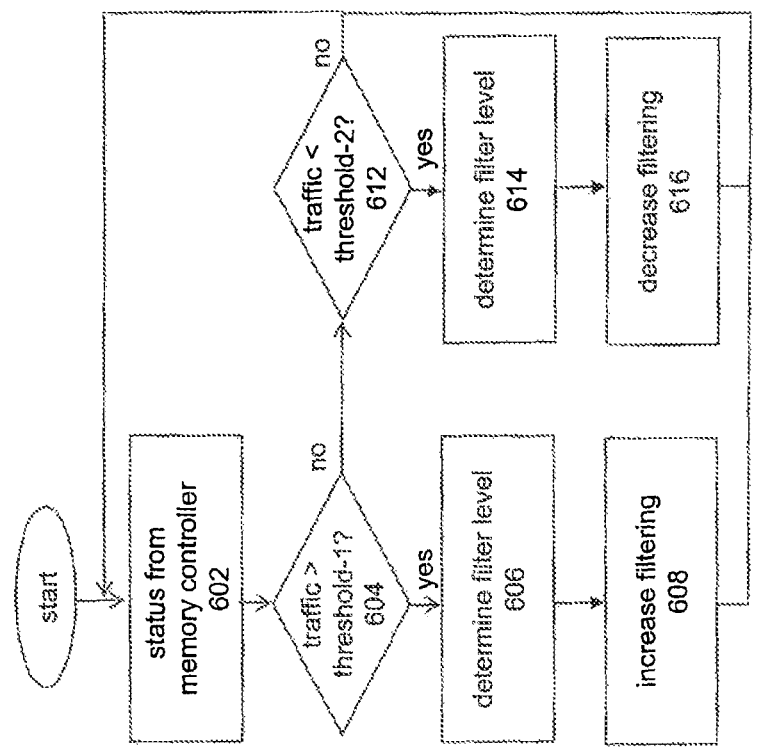
FIG. 6 is a flowchart illustrating the dynamic control of the flow of probe event traffic between the monitor device and a memory controller, according to an embodiment of the present invention.

FIG. 6 is a flowchart 600 that illustrates an exemplary scheme for dynamically controlling the probe event collection to ensure that the probe event collection does not adversely affect system performance. In step 602, the memory controller, such as memory controller 108 of computer system 100, notifies a status change to the thread trace device such as event flow control device 216 of thread control device 112. By way of example, the change in status reported by the memory controller can include information of the memory traffic level, information that a threshold level of memory traffic has been met, or any other information that enables the thread trace unit to throttle or accelerate the probe event collection. For example, if the memory controller reports the current level of memory traffic, in step 604, the thread trace device can determine whether the current level of memory traffic exceeds a predetermined upper threshold. Alternatively in step 612, the thread trace device can determine whether the reported traffic level is below a predetermined lower threshold.

If the traffic level is found to exceed the predetermined upper threshold, then in step 606, an appropriate filtering level or criteria may be determined. In step 608, the event filter can be adjusted to implement a filtering criteria that reduces the memory traffic due to probe events. For example, event flow controller device 216 can cause the event filter device 204 to drop all probe events other than thread create events and thread terminate events. A person skilled in the art will understand that many configuration variations of the filtering device may be made to reduce the amount of probe events being transferred to memory. Error handler device 210 may also be notified, in step 608, so that appropriate error handling markers can be inserted into the affected probe event data units.

If, in step 612, it is determined that the memory traffic level has dropped below a predetermined lower threshold, then in step 614, an appropriate decrease in filtering level may be determined. Subsequently, in step 616, the event filter device may be notified to allow more probe events to be processed. For example, event flow controller device 214 may cause the event filter device 204 to allow all probe events. A person skilled in the art will understand that many configuration variations of the filtering device may be made to increase the amount of probe events being transferred to memory. Error handler device 210 may also be notified, in step 616, so that appropriate error handling messages can be inserted into the affected probe event data units.

In general, the steps of flowchart 600 when implemented can allow a computer system to operate without its processing activities being significantly affected while simultaneously generating a high level of trace information. In contrast to conventional debugging and monitoring systems in which the level of desired trace information must be specified statically before system startup, the present invention allows the system to dynamically configure itself to obtain the maximum amount of trace information without affecting system performance.

CONCLUSION

Embodiments of the present invention may be used in any computer system or computing device where monitoring of one or more concurrently executing processes or threads is desired. For example and without limitation, embodiments may include computers, game platforms, entertainment platforms, personal digital assistants, and video platforms.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for monitoring performance of a computer system, the method comprising:
    inserting one or more hardware probes in at least one processing unit, wherein the hardware probes are configured to generate probe signals in response to detecting predetermined processing events;
    configuring a hardware-based device to:
    receive the probe signals from the hardware probes;
    store probe event messages for the received probe signals in an event memory in the hardware-based device;
    transfer the probe event messages from the event memory to a memory external to the hardware-based device via a first-in-first-out buffer;
    provide feedback to the hardware-based thread trace device wherein the feedback includes a current measure of accesses to the memory external to the hardware based device; and
    regulate a frequency of the transfer of the probe event messages from the event memory based on the feedback.

2. The method of claim 1, wherein the configuring a hardware-based device comprises:
    collecting the probe signals; and
    timestamping the probe event messages, wherein the probe event messages are based on the probe signals.

3. The method of claim 2, wherein the configuring a hardware-based device further comprises:
    filtering the probe signals, wherein filtering is based on a configurable filter criteria.

4. The method of claim 2, wherein the configuring a hardware-based device further comprises:
    compressing the probe event messages.

5. The method of claim 2, wherein the configuring a hardware-based device further comprises:
error processing of the probe event messages.

6. The method of claim 1, further comprising:
accessing the probe event messages in the memory external to the hardware-based device, wherein the accessing is by a software program to analyze the performance of the computer system.

7. The method of claim 1, further comprising:
configuring a memory controller device to:
transfer the probe event messages from the first-in-first-out buffer to the memory external the hardware-based device.

8. The method of claim 7, wherein the feedback dynamically controls and adjusts a collection and transfer of probe signals and probe event messages.

9. An apparatus for monitoring the performance of a computer system, comprising:
one or more processing units;
a memory;
a connector device connecting the one or more processing units and the memory;
one or more hardware probes included in at least one of the processing units and configured to generate probe signals in response to detecting predetermined processing events;
a hardware-based thread trace device connected to the connector device, the thread trace device including (i) an event memory, (ii) an event interface configured to receive the probe signals from the hardware probes and to store probe event messages for the received probe signals in the event memory, and (iii) an event memory buffer controller configured to send probe event messages from the event memory to the memory;
a memory controller device configured to transfer the probe event messages from the hardware-based thread trace device to the memory via a first-in-first-out buffer; and
the memory controller device further configured to provide feedback to the hardware-based thread trace device, the feedback including a current measure of accesses to the memory,
wherein the hardware-based thread trace device is configured to regulate a frequency of the transfer of the probe event messages from the event memory based on the feedback.

10. The apparatus of claim 9, wherein the hardware-based thread trace device further comprises:
a timestamper device configured to timestamp the probe event messages.

11. The apparatus of claim 10, wherein the hardware-based thread trace device further comprises:
an event data packing device configured to generate a probe event unit, wherein the probe event unit includes the probe event messages.

12. The apparatus of claim 9, wherein the hardware-based thread trace device further comprises:
a filtering device configured to filter the received probe signals based on a filter criteria.

13. The apparatus of claim 12, wherein the filter criteria is configurable.

14. The apparatus of claim 11, wherein the hardware-based thread trace device further comprises:
an error handler device configured to process the probe event messages for errors.

15. The apparatus of claim 14, wherein the error handler device is further configured to insert error handling markers into the probe event unit.

16. The apparatus of claim 11, wherein the event data packing device is further configured to compress the probe event unit.

17. The apparatus of claim 9, wherein the feedback dynamically controls and adjusts a collection and transfer of probe signals and probe event messages.

18. The apparatus of claim 17, further comprising:
a trace event processing module configured to access the probe event messages in the memory.

19. The apparatus of claim 9, wherein the processing events include thread events.

* * * * *